US010918467B2

(12) United States Patent
Davidov

(10) Patent No.: US 10,918,467 B2
(45) Date of Patent: Feb. 16, 2021

(54) DISPOSABLE PORTABLE POCKET FLUID AND FLOSS DISPENSER

(71) Applicant: Mark Davidov, Kew Gardens, NY (US)

(72) Inventor: Mark Davidov, Kew Gardens, NY (US)

( * ) Notice: Subject to any disclaimer, the term of this patent is extended or adjusted under 35 U.S.C. 154(b) by 360 days.

(21) Appl. No.: 15/832,160

(22) Filed: Dec. 5, 2017

(65) Prior Publication Data

US 2018/0161135 A1 Jun. 14, 2018

Related U.S. Application Data

(60) Provisional application No. 62/432,234, filed on Dec. 9, 2016.

(51) Int. Cl.
*A61C 15/00* (2006.01)
*A61C 15/04* (2006.01)
*B65H 49/20* (2006.01)

(52) U.S. Cl.
CPC .......... *A61C 15/043* (2013.01); *B65H 49/20* (2013.01); *B65H 2701/30* (2013.01)

(58) Field of Classification Search
CPC ..... A61C 15/043; A61C 15/00; A61C 15/045; A61C 15/04; A61C 15/046; A61C 9/0033; B65H 49/20; B65H 49/205; B65H 2701/30; A45C 5/005; A45C 11/008; A45D 33/26; A45D 34/00; A45D 34/02; A45D 34/06; A45D 2034/005; A45D 2034/007; A45D 2040/0012; A45D 40/00; A45D 40/18; A45D 40/22; A45D 40/24; A45D 40/0075; A45D 2200/05; A45D 2200/057; A45D 2200/25; A45D 33/06; B65D 47/2031
USPC ....... 132/324, 325, 326, 286, 309, 314, 315, 132/294, 295, 298, 299, 321, 323, 322, 132/308; 401/31, 34, 35, 278, 146, 150, 401/151, 195; 206/235, 581, 229, 63.5, 206/368, 388
See application file for complete search history.

(56) References Cited

U.S. PATENT DOCUMENTS

| 1,194,187 | A |   | 8/1916 | Kendall |
|---|---|---|---|---|
| 1,454,429 | A | * | 5/1923 | Dresser ............... A61C 15/043 |
|   |   |   |   | 242/138 |
| 2,533,495 | A |   | 12/1950 | Moffett |
| 2,547,971 | A | * | 4/1951 | Polin ..................... A45D 33/28 |
|   |   |   |   | 132/297 |
| 3,890,986 | A | * | 6/1975 | Gerlich .............. A46B 15/0071 |
|   |   |   |   | 132/309 |
| 3,897,005 | A |   | 7/1975 | Reiner |
| 4,562,923 | A | * | 1/1986 | Katada ................... A45D 40/24 |
|   |   |   |   | 132/314 |
| 4,662,541 | A |   | 5/1987 | Fossati |
| 4,790,429 | A |   | 12/1988 | Fukushima |
| 4,809,914 | A |   | 3/1989 | Goncalves |

(Continued)

*Primary Examiner* — Rachel R Steitz
(74) *Attorney, Agent, or Firm* — Richard B Klar, Esq.; Law Office Richard B Klar

(57) ABSTRACT

A disposable, portable and compact fluid and floss dispenser that is substantially rectangularly shaped with dispensers for fluid located at each of the four slanted configured corners and a spindle for dispensing floss and a mirror located on the bottom surface of the dispenser housing. The housing includes three layers or sections connected together. Nozzles are provided on the housing to dispense fluid in liquid or droplet form, or foam.

12 Claims, 10 Drawing Sheets

(56) References Cited

U.S. PATENT DOCUMENTS

| | | | | |
|---|---|---|---|---|
| 4,865,481 A * | 9/1989 | Scales | ............... | A46B 11/00 |
| | | | | 401/195 |
| 4,883,080 A | 11/1989 | Lang | | |
| 5,054,674 A * | 10/1991 | Fortman | ............... | A47K 1/09 |
| | | | | 225/42 |
| 5,076,302 A * | 12/1991 | Chari | ............... | A61C 15/043 |
| | | | | 132/324 |
| 5,282,563 A * | 2/1994 | Oliver | ............... | A47F 13/04 |
| | | | | 225/46 |
| 5,301,808 A * | 4/1994 | Pierson | ............... | A45D 40/24 |
| | | | | 132/297 |
| D368,986 S | 4/1996 | Haber et al. | | |
| 5,582,195 A | 12/1996 | Nagel | | |
| 5,678,578 A * | 10/1997 | Kossak | ............... | A61C 15/046 |
| | | | | 132/322 |
| 5,692,532 A * | 12/1997 | Gabrovsek | ............... | A61C 15/046 |
| | | | | 132/323 |
| 5,906,213 A | 5/1999 | Diffendal | | |
| 7,478,960 B2 * | 1/2009 | Glover | ............... | A46B 11/0055 |
| | | | | 401/188 R |
| 7,942,155 B2 | 5/2011 | Van Iderstine | | |
| 7,942,279 B2 | 5/2011 | Grant et al. | | |
| 8,469,236 B2 | 6/2013 | Kharas | | |
| 9,517,118 B1 * | 12/2016 | Borg | ............... | A61C 15/046 |
| 2002/0088474 A1 * | 7/2002 | Montalvo | ............... | A46B 11/001 |
| | | | | 132/309 |
| 2005/0111905 A1 * | 5/2005 | Glover | ............... | A46B 11/0055 |
| | | | | 401/278 |
| 2005/0147461 A1 * | 7/2005 | Glover | ............... | A46B 11/0055 |
| | | | | 401/279 |
| 2005/0230425 A1 | 10/2005 | Genosar | | |
| 2005/0263169 A1 * | 12/2005 | Romine | ............... | A61C 15/043 |
| | | | | 132/321 |
| 2006/0254610 A1 * | 11/2006 | Chen | ............... | A61C 15/046 |
| | | | | 132/325 |
| 2010/0096413 A1 | 4/2010 | Genosar | | |
| 2012/0241465 A1 | 9/2012 | Genosar et al. | | |
| 2015/0122840 A1 * | 5/2015 | Cox | ............... | B65D 75/008 |
| | | | | 222/159 |

* cited by examiner

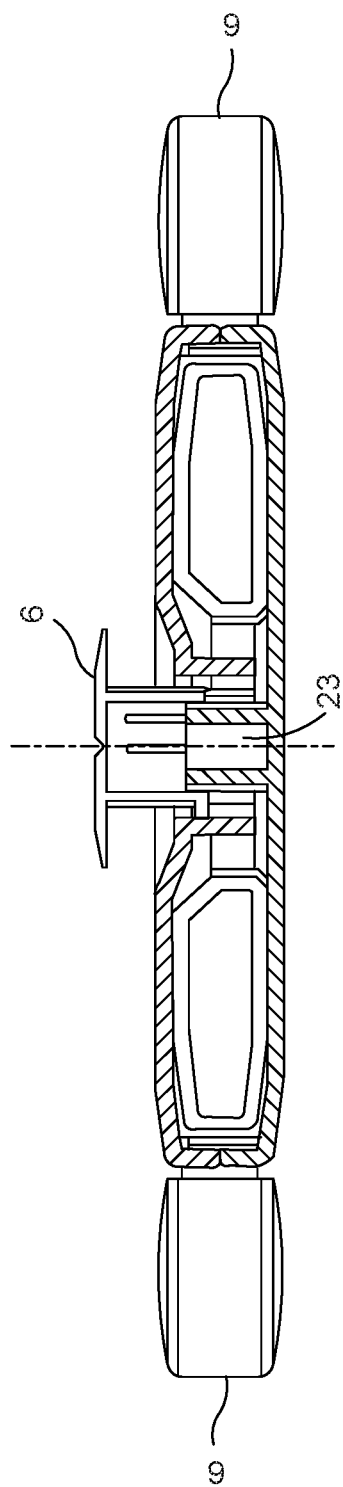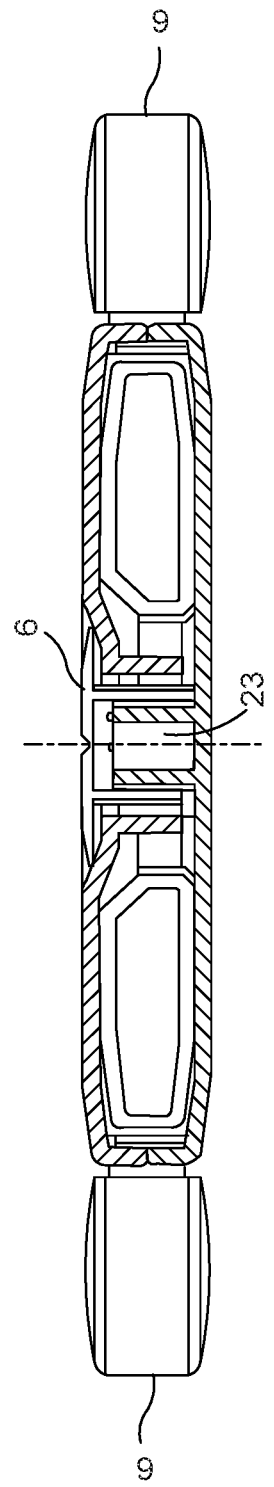

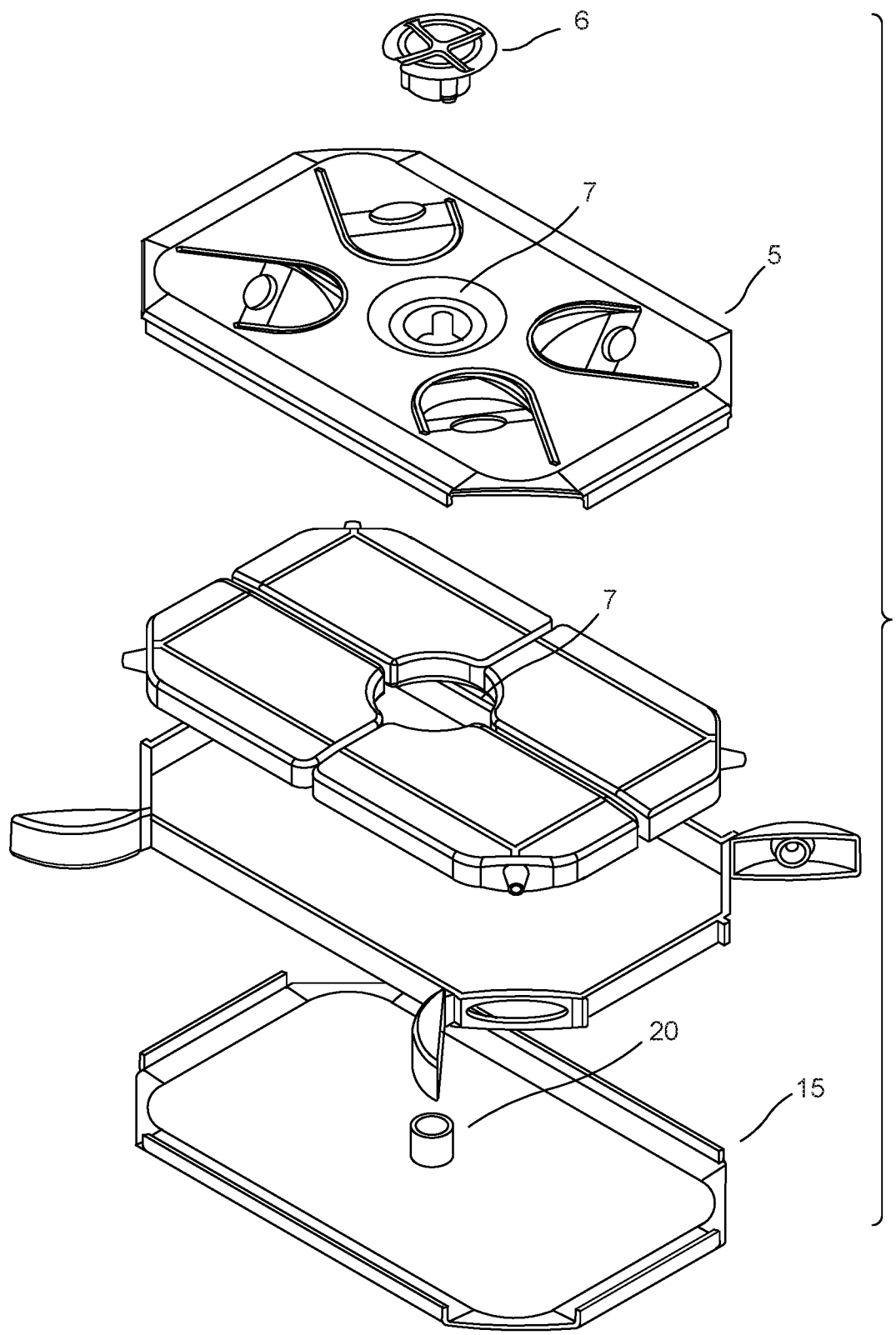
F I G. 3

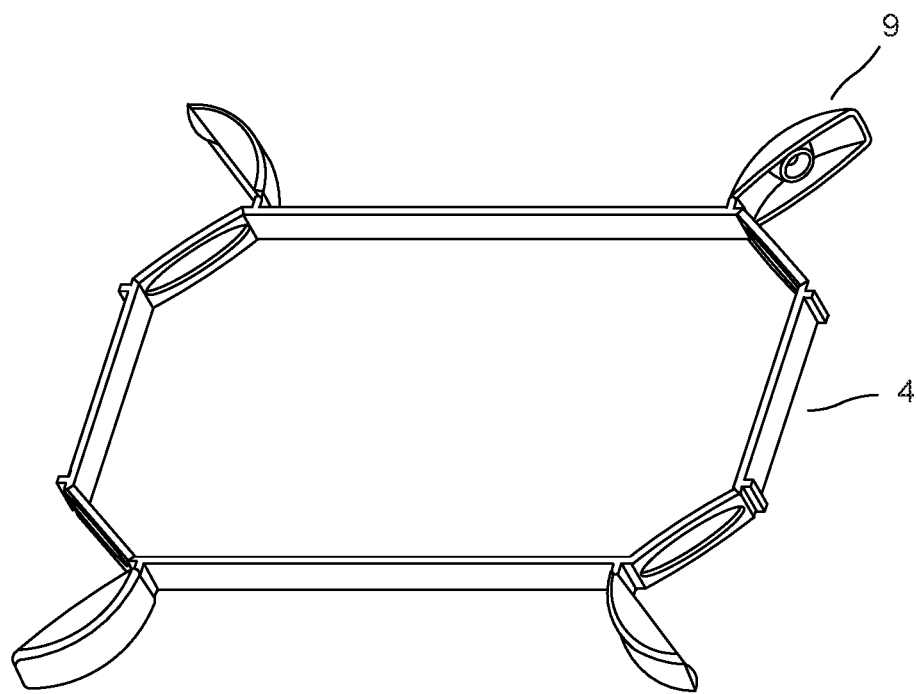
F I G. 6A
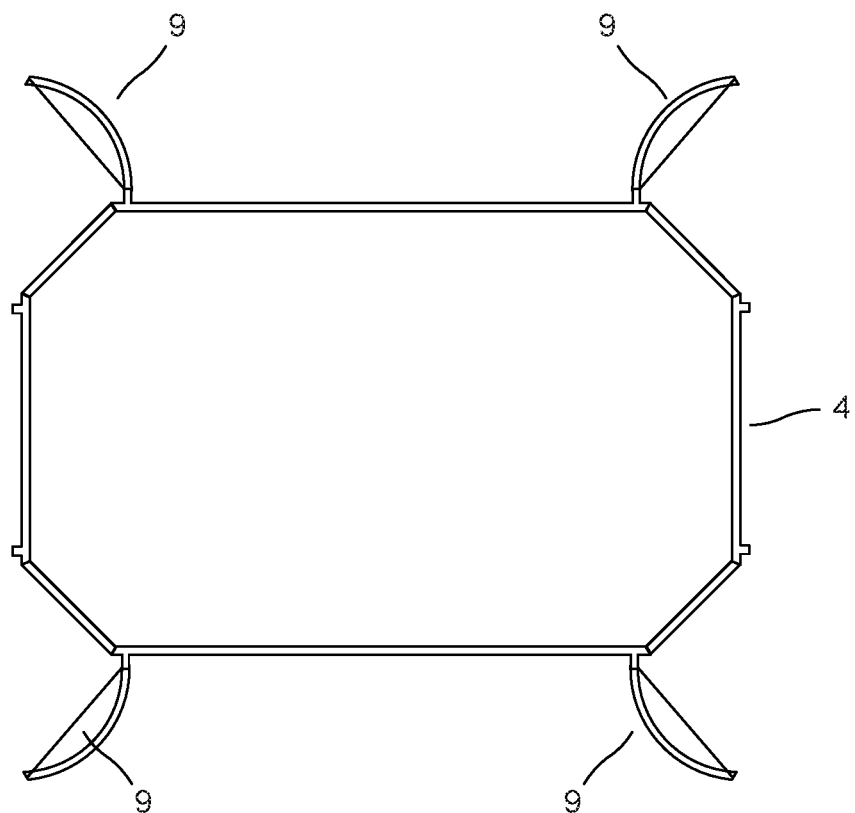
F I G. 6B

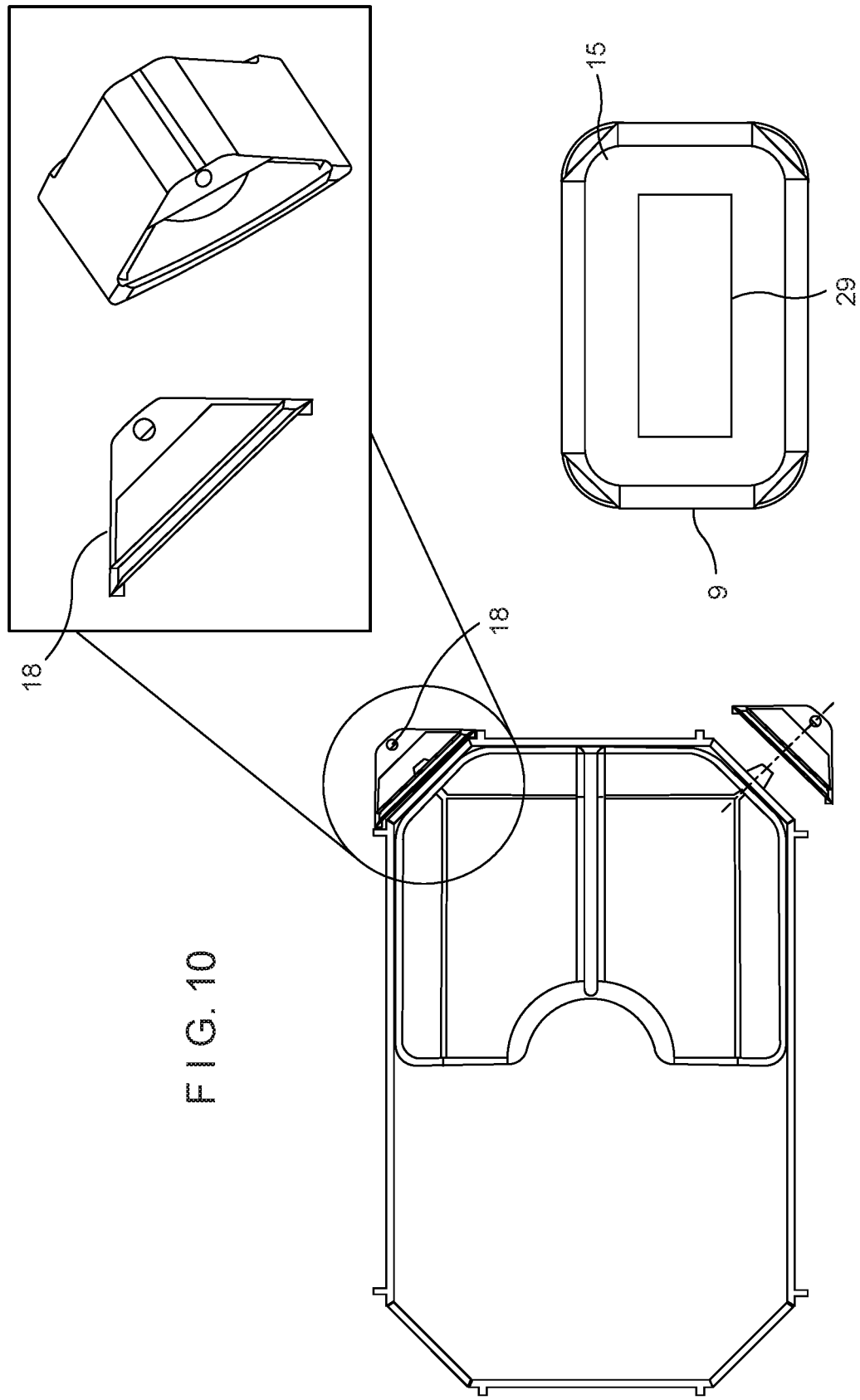

DISPOSABLE PORTABLE POCKET FLUID AND FLOSS DISPENSER

BACKGROUND

1. Field

The present invention relates to a disposable portable pocket fluid and floss dispenser. In particular, the present invention relates to a portable compact device for dispensing fluid such as q liquid medication, mouthwash, eyedrops, etc. and a dispenser for floss with a mirror located on the bottom surface of the compact device that is thin and be carried in a pocket by a user.

2. The Related Art

SUMMARY

The present invention providing a disposable, portable and compact fluid and floss dispenser that is substantially rectangularly shaped with dispensers for fluid located at each of the four slanted configured corners and pop up spindle for dispensing floss and a mirror located on the bottom surface of the dispenser housing.

BRIEF DESCRIPTION OF THE DRAWINGS

FIG. 2A-2B shows the floss spindle of the present invention in which:

FIG. 2A is a partial sectional view along lines A-A of FIG. 1 showing the floss spindle in it popped up position for dispensing floss; and FIG. 2B shows the floss spindle pressed down and locked din place within n the dispenser of the present invention;

FIG. 3 is a partially exploded perspective view of the present invention;

FIGS. 4A and 4B are perspective and sectional views, respectively, of the present invention in which:

FIG. 4A is a perspective view of the present invention wherein the pressure buttons are not depressed;

FIG. 4B is a sectional view of FIG. 4A;

FIG. 5A-5B show the activation mechanism for dispensing fluid or foam though the nozzles of the present invention in which:

FIG. 5A is a perspective view of the present invention wherein the pressure buttons are depressed thereby pressing down into the second layer on the fluid or foam or drops in the containers of the second layer of the present invention to dispense the fluid or foam through the nozzles;

FIGS. 6a-6B show the frame for the present invention in which:

FIG. 6A is a perspective view of the frame housing and encasing and securely holding the first, second and third layers of the present invention in place; and FIG. 6B is a top view of FIG. 6A;

FIGS. 8A and 8B show the floss spindle engaging mechanism in which:

FIG. 8A shows a bottom perspective view of the mechanism;

FIG. 8B shows a top perspective view of the engagement mechanism;

FIG. 10 shows a spray nozzle of the present invention; and

FIG. 11 shows a bottom view of the third layer the present invention with a mirror thereon.

DETAILED DESCRIPTION OF THE PREFERRED EMBODIMENTS

Figure 1:
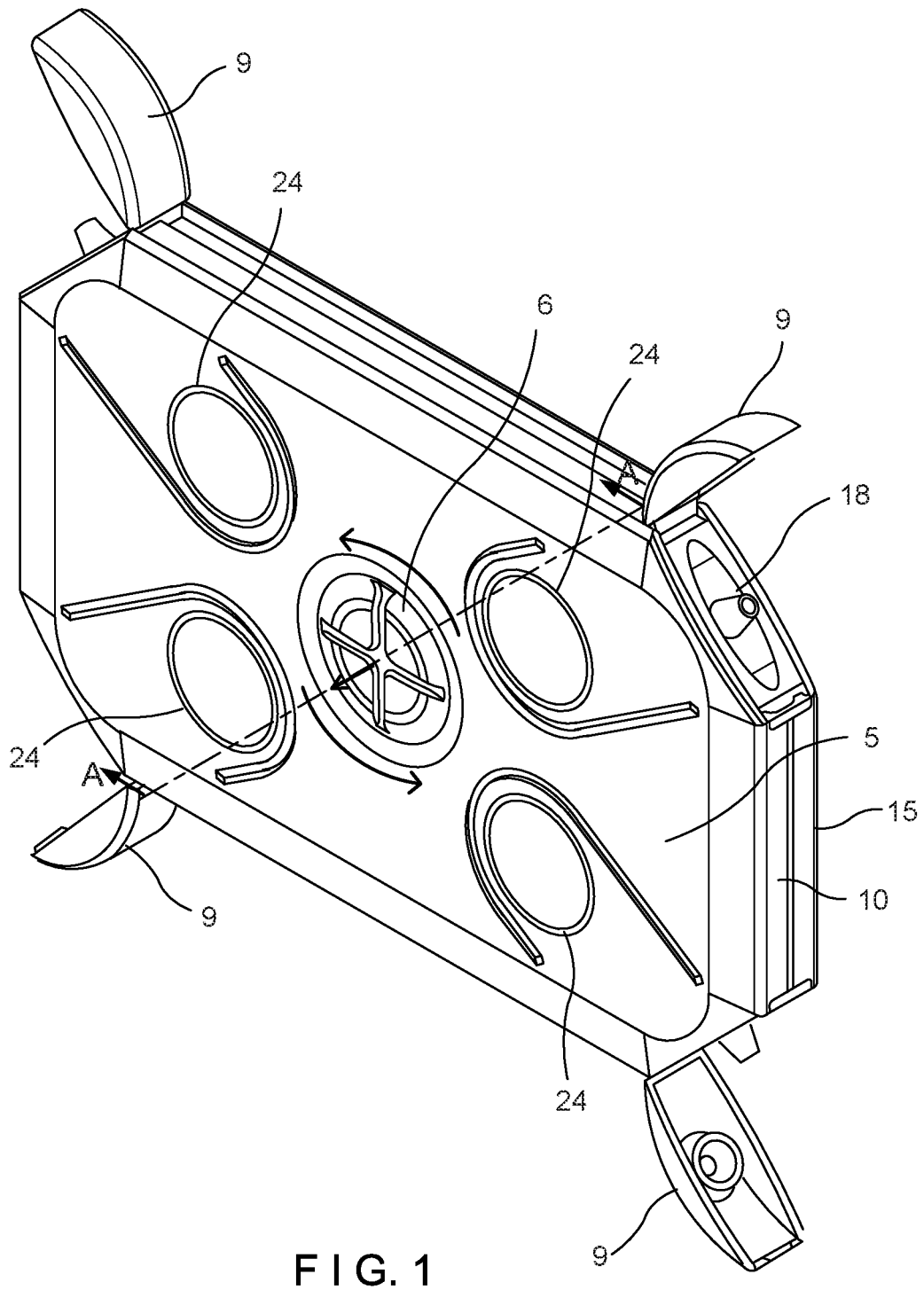
FIG. 1 shows a first embodiment with nozzle disposers for fluids a perspective view of the present invention with section line A-A.
Figure 4A:
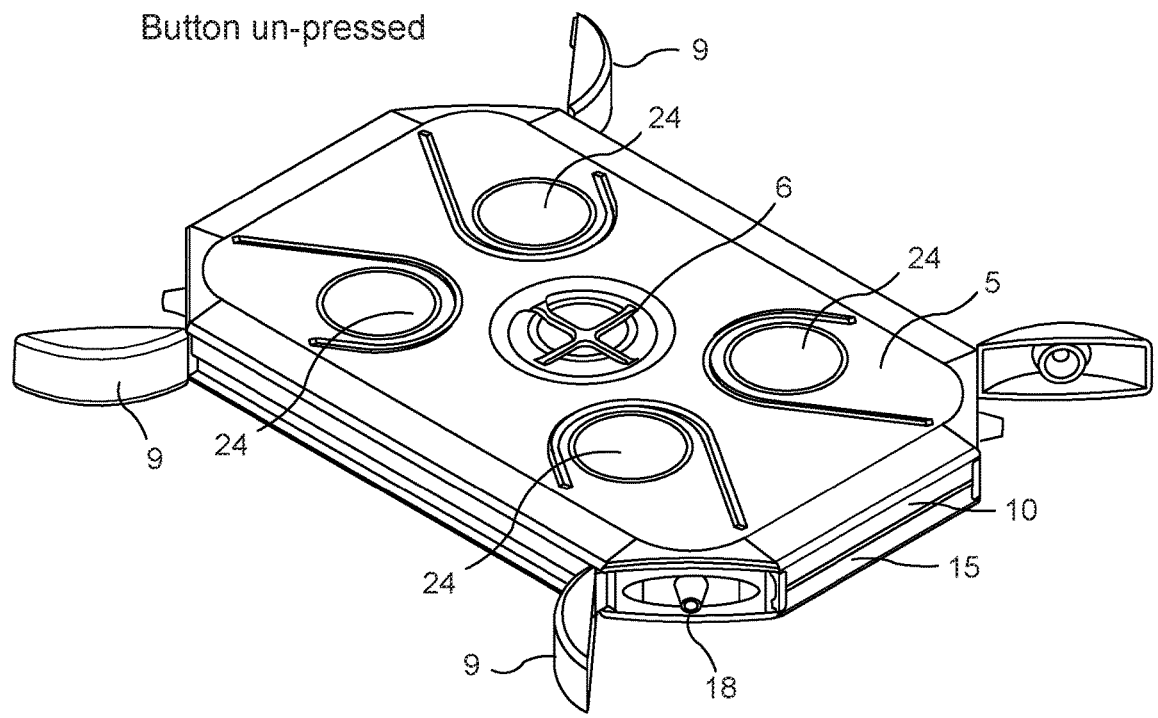
Figure 4B:
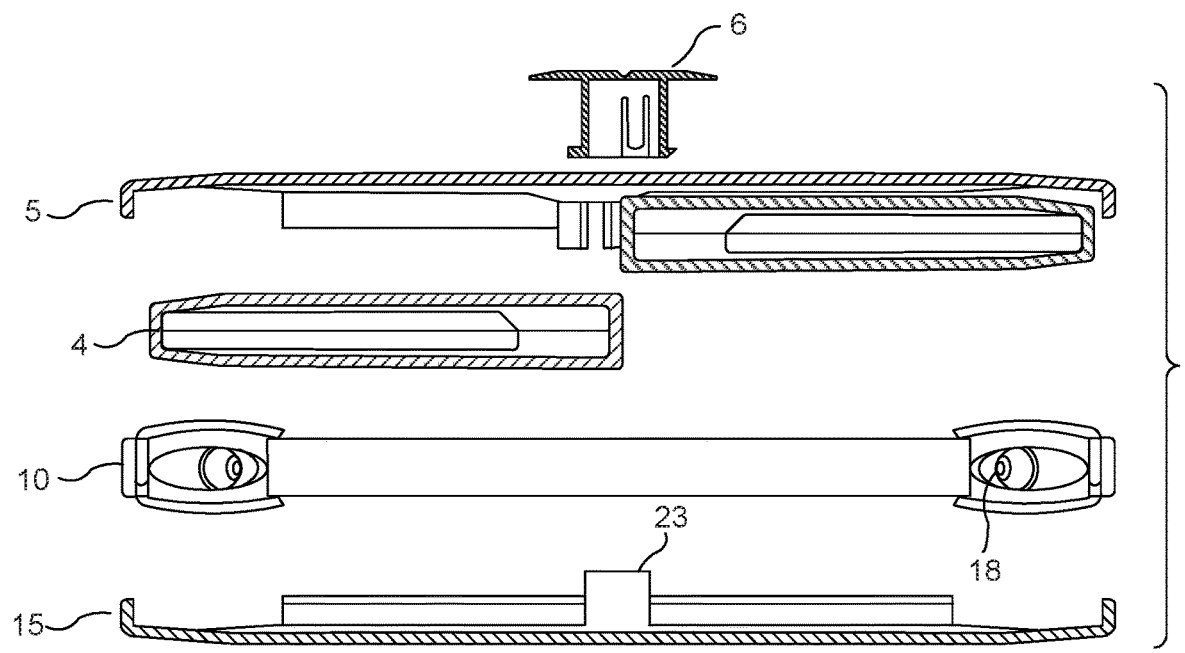
Figure 5A:
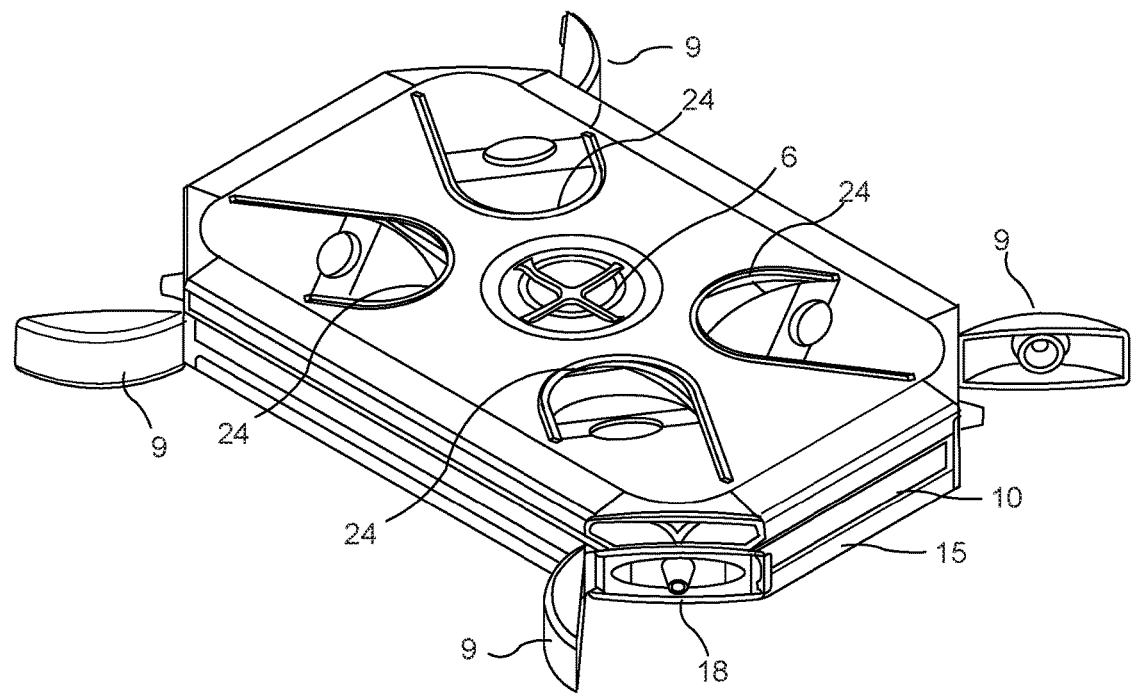
Figure 5B:
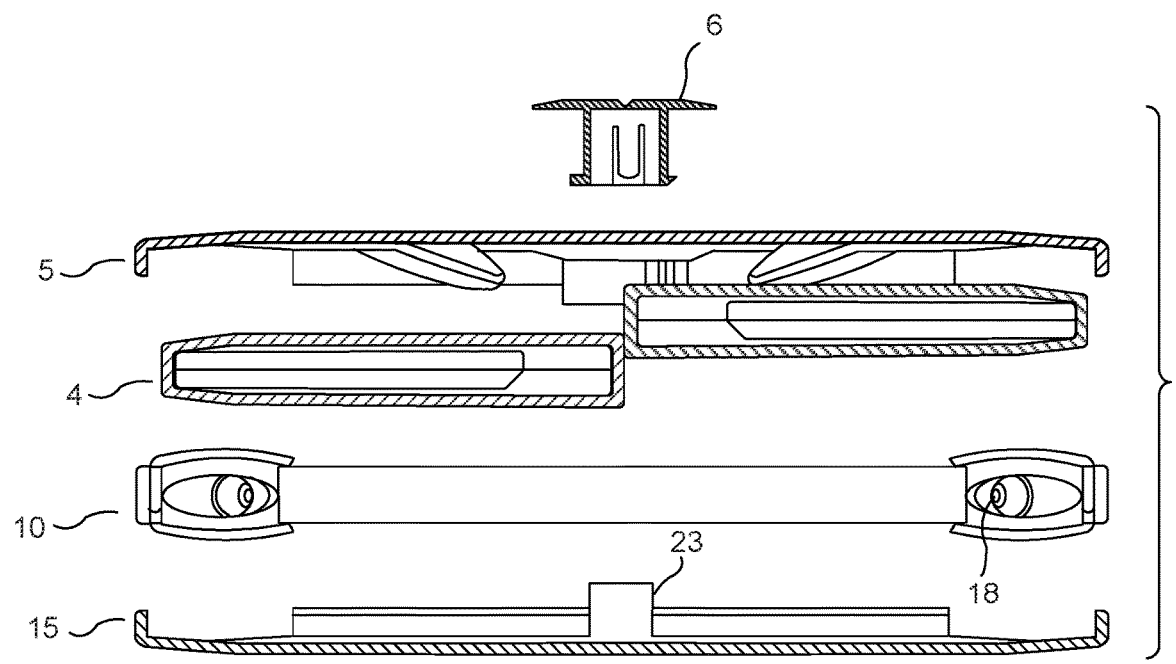
Figure 7:
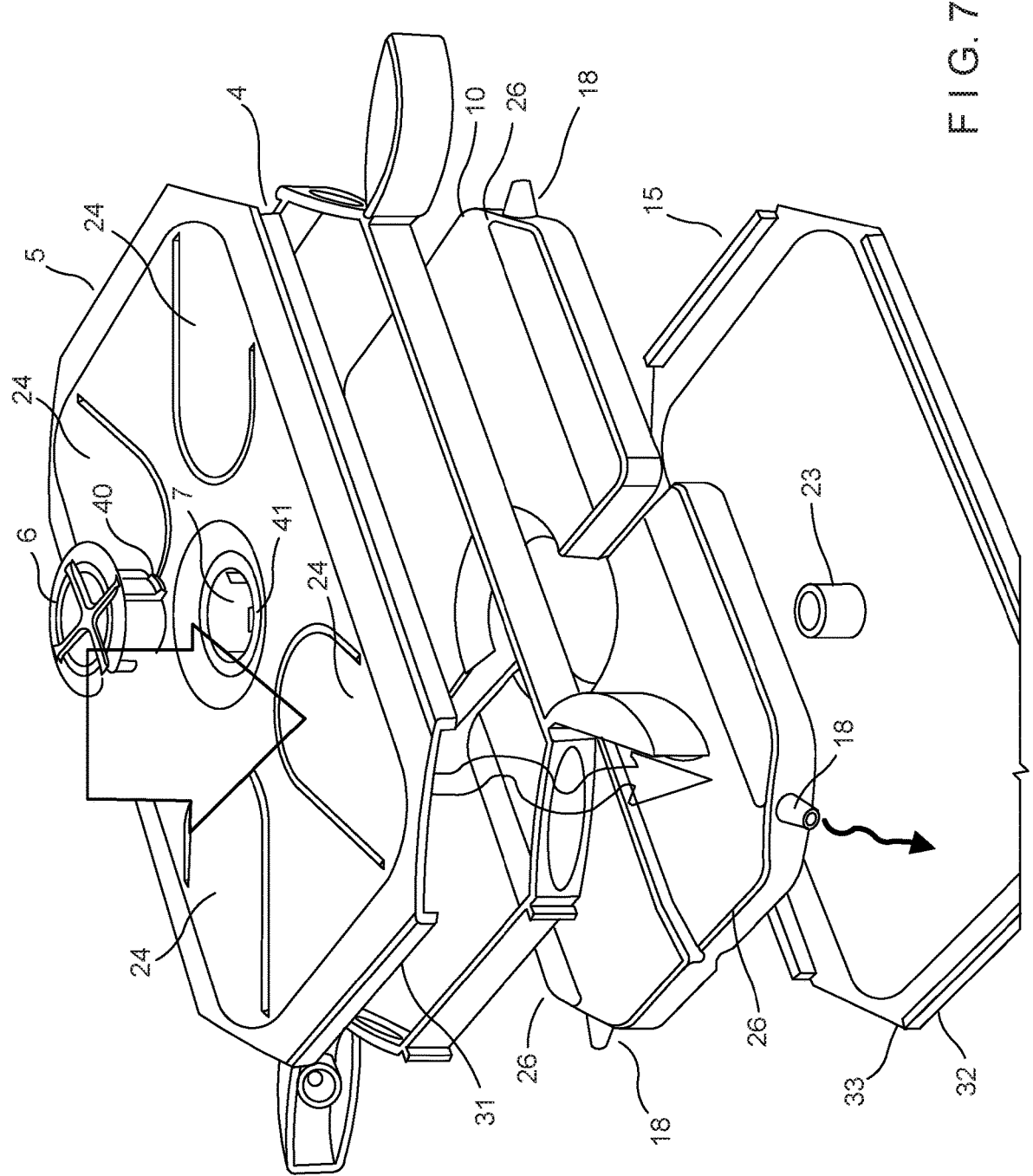
FIG. 7 is a partially exploded perspective view showing how the pressure buttons activate the fluid foam or drop containers to dispense through the nozzles and how the floss spindle is engaged and disengaged for dispensing floss.
Figure 8A:
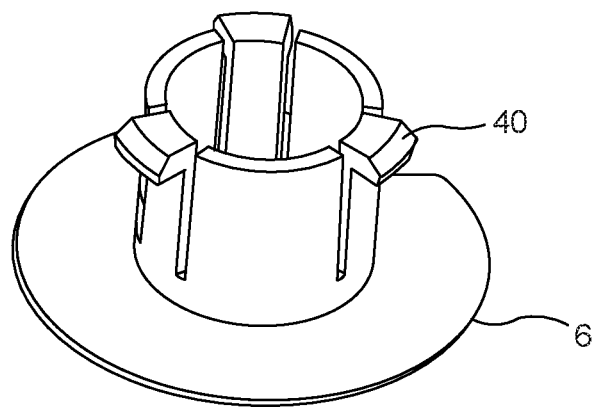
Figure 8B:
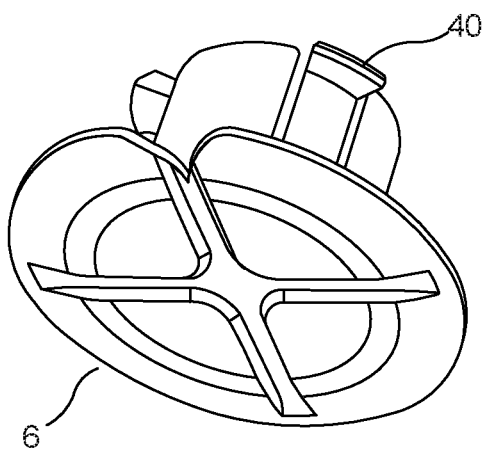
Figure 9:
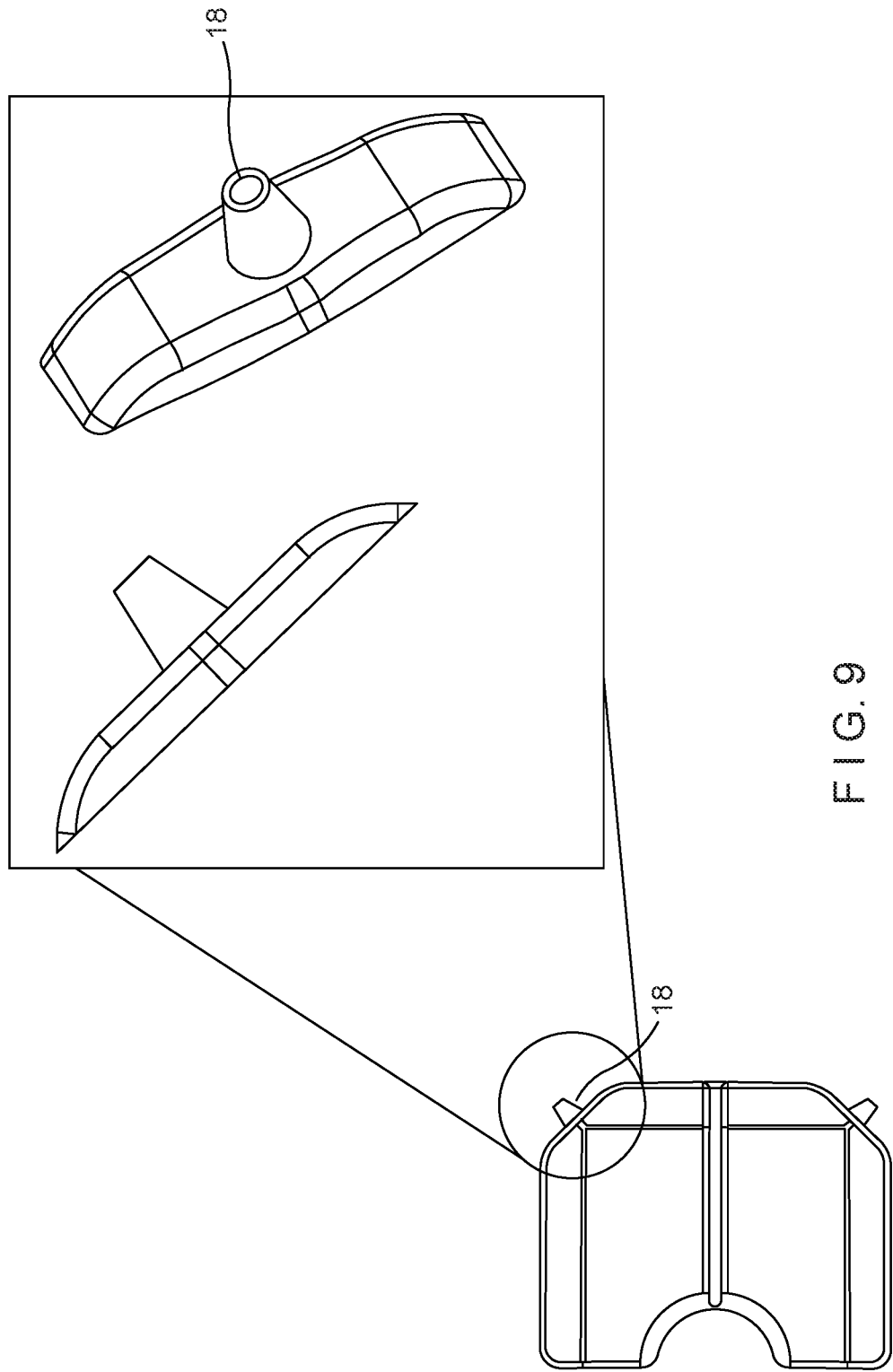
FIG. 9 shows a fluid nozzle of the present invention.

The present invention relates to a portable pocket fluid and floss dispenser suitable for dispensing fluids such as mouthwash, fluid headache medication, hand gels, shampoo, liquid or foam having liquid or foam dispensers or spray dispenser nozzles. Referring now to the drawings of FIGS. 1-11, FIG. 1 shows an embodiment of the present invention which has three layers or sections 5, 10 and 15 and an outer frame 4 housing and connecting the three layers 5, 10 and 15 together. The three layers include a top layer 5 having a pop up floss spindle 6 which pops up when pressed and/or rotated as shown in FIG. 1. The top layer 5 of the present invention or device has a spindle portion 6 onto which floss is wound about to be dispensed by a user. As can be seen in the third and or bottom layer 15 there is a holder for the pop up spindle mechanism for the floss a spindle 6 and an opening 7 that goes through the second layer 10 in order to provide a firm holding connection for the spindle 6 with the holder 23 of the spindle 6. The top layer 5 has an opening housing an engagement mechanism for the floss spindle 6 with a neck having tabs that engage with notches on a neck of the opening when the spindle 6 is pressed downward and rotated in either direction to lock the spindle in place so that the top surface of the floss spindle 6 is flush with the top surface of the top layer 5 of the present invention. When the spindle 6 is pressed downward again and rotated the tabs disengage from the notches and the spindle 6 pops up to permit dispensing of floss on the neck of the spindle 6 by a user.

The frame 4 of the present invention is preferably rectangularly shaped and has 4 corners that are slanted or angled in which nozzles 18 are provided on the third layer of the housing to dispense fluid. As shown in FIG. 1 the nozzles 18 can be liquid dispensers. Alternatively as shown in FIG. 2C it can be spray dispensers or alternatively it can be foam or drop dispensers depending on the fluid, spray fluid, drops or foam to be dispensed. It is also possible for the present invention to have a mix of different nozzles of each of these dispensers such as a fluid dispenser, a foam dispenser and a spray dispenser including a fluid dispenser that can be configured as an eye drop dispenser for dispensing eye drop or throat or nasal drop medication or contact lens fluid. The nozzles can have a cover or lid 9 on them as shown in FIG. 1 The present invention is preferably manufactured of polypropylene plastic material or else any other suitable alternative plastic material. The three layers 5, 10 and 15 shown in FIG. 1 can snap together assemble to a relatively thin container for dispensing fluids that can be disposable, portable and fit into a pocket of a user. The frame 4 is fixedly connected to the three layers 5, 10 and 15 preferably with adhesive material making the present invention a disposable device.

The size of the device e.g. the present invention is preferably the size of a credit card. Alternative plastic materials for the present invention include polycarbonate/ ABS polyester thermoplastic polyphenylene oxide, poly pehenylne sulfide polystyrene and poly the general purpose and also polystyrene high impact in addition styrene acrylonitrile can be used. In FIG. 1 the first top layer 5 has the top surface of the spindle 6 thereon. There are also squeezable plastic pressure flaps 24 that bend downward to put pressure on a respective one of the a fluid or foam container in the second layer of the present invention to disuse the fluid or foam therein through its respective nozzle as shown in FIG. 1 thereby pressing the dispensed fluid or foam from the nozzles. Alternatively each nozzle 18 can have an activation button on it which can be manually pressed by a user to dispense the fluid, drop, foam or spray through its respective nozzle 18 (see FIG. 7).

The second layer 10 underneath the top layer 5 contains the nozzles 18 on each of the four slanted corners, the frame 4 contains a cover or lid 9 for the nozzles 18 on each of the 4 corners where the lid 9 can be manufactured as a hinge mechanism such as but not limited to a living hinge to open or close out by simply flipping it open or close and the bottom layer 15 contains the holder 23 for the floss spindle 6. Underneath the bottom of the surface of the bottom layer 6 as shown in FIG. 2F is a mirror 29 for the user to use when flossing his teeth or combing his hair, etc. (see FIG. 11). There is an overleaf 31 on the top layer 5 which preferably engages with and preferably connects to the overleaf 32 of the bottom layer 15 by preferably ultrasonic welding or blow molding or by any known technique in the art to keep the entire device sealed in place. Preferably the second layer 10 would be made of a high density polyethylene plastic material and the layer underneath that would be made of a polypropolene material. In operation the present invention work as follows. A user would take the assembled version of the present invention and dispense fluid or foam by pressing on one of the four plastic pressure tabs 24 after flipping open the lid 9 on the corresponding nozzle 18 to dispense fluid or foam. This may be either one of the aforementioned fluids, drops, spray or foams noted above. The user may also rotate and press on the floss dispenser 6 at the top surface 5 to release the pop up spindle 6 and release floss as can be seen there is a neck on the spindle having tabs 40 which engages notches 41 in the neck of the opening that serves to catch the spindle 6 in place as shown in the top portion of FIG. 1 of the drawings when the floss spindle is pressed downward and rotated in either direction in the opening. By pressing downward gain in the spindle 6 and rotating the spindle 6 the floss spindle disengages its tabs 40 from the notches 41 in the opening and pops o up to permit floss to be dispensed by a user. The holder 23 on the third layer 15 can include a spring (not shown) to bias the floss spindle 6 upward when the spindle 6 is released to pop up for dispensing floss. In this way a user can carry with him medication or any fluid or foam toiletry required for cosmetic grooming in an efficient and portable manner.

FIG. 10 shows a nozzle 18 a covering lid 9 for the fluid, foam or drop nozzle 6.

A mirror 29 is preferably located and affixed preferably by adhesive material to a bottom surface of the third layer 15 for use by a user as shown in FIG. 11.

While presently preferred embodiments have been described for purposes of the disclosure, those skilled in the art can make numerous changes in the arrangement of method steps. Such changes are encompassed within the spirit of the invention as defined by the appended claims.

What is claimed:

1. A dispenser configured to dispense fluids and floss, the dispenser being disposable, portable and sized to fit into a pocket of a user, the dispenser comprising:

a rectangular frame with four angled corners, the rectangular frame disposed around three layers and configured to connect and secure the three layers together;

the three layers comprising a bottom layer, a middle layer and a top layer;

wherein the middle layer comprises a plurality of containers capable of holding the fluids;

wherein the top layer comprises a plurality of flaps capable of being pressed downward to exert pressure on the plurality of containers in order to dispense the fluids from the plurality of containers; wherein the top layer has a protruding tubular neck comprising a through-hole and a plurality of notches on an inside wall of the through-hole; wherein the middle layer has a central opening receiving the protruding tubular neck; wherein the bottom layer comprises a spindle holder aligned with the central opening and the protruding tubular neck; a plurality of nozzles, each of the nozzles disposed on one of the angled corners; wherein the nozzles are in fluid communication with the plurality of containers and the nozzles are configured to dispense the fluids as drops, foam, or spray; wherein each nozzle is covered by a hinged lid disposed on a respective angled corner;

a spindle with the floss wound around the spindle, wherein the spindle is sized to fit within the through-hole and sized so that when in a closed position, a top side of the spindle is flush with a top side of the top layer and a bottom portion of the spindle is positioned around the spindle holder; wherein a plurality of tabs are disposed on a circumferential side of the spindle, the tabs configured to engage with the notches in order to secure the spindle into the dispenser, the tabs configured so that, when the spindle is pressed downward and rotated, the tabs disengage from the notches so that the spindle pops up to dispense the floss to the user.

2. The dispenser according to claim 1 wherein said nozzles include at least one fluid nozzle.

3. The dispenser according to claim 1 wherein said nozzles include at least one foam nozzle.

4. The dispenser according to claim 1 wherein said nozzles include at least one spray nozzle.

5. The dispenser according to claim 1 wherein said nozzles include at least one nozzle for dispensing eye drop fluid.

6. The dispenser according to claim 1 wherein said nozzles include at least one nozzle for dispensing nasal drop fluid.

7. The dispenser according to claim 1 wherein said nozzles includes nozzles for dispensing fluid in liquid form, nasal fluid, eye drop fluid and fluid as a spray.

8. The dispenser according to claim 1 wherein each said flap further includes an activation button thereon which can be manually pressed to dispense fluid or foam there through.

9. The dispenser according to claim 1 wherein said dispenser is made of polypropylene plastic material.

10. The dispenser according to claim 1 wherein said frame is rectangularly shaped.

11. The dispenser according to claim 1 wherein said housing can be configured to have the length and width of approximately the size of a credit card.

12. The dispenser according to claim 1 wherein said spindle holder includes a spring to bias said spindle upward when said spindle is pressed downward and rotated to release the spindle so it pops upward in a direction of the top layer.

* * * * *